United States Patent [19]
Bordsen et al.

[11] Patent Number: 5,193,162
[45] Date of Patent: Mar. 9, 1993

[54] CACHE MEMORY WITH DATA COMPACTION FOR USE IN THE AUDIT TRAIL OF A DATA PROCESSING SYSTEM HAVING RECORD LOCKING CAPABILITIES

[75] Inventors: Donald T. Bordsen, St. Paul; Thomas P. Cooper, New Brighton; Robert F. Esson; Michael J. Hill, both of Vadnais Heights; John R. Jordan, St. Paul; Joseph E. Kessler, St. Anthony; Dennis R. Konrad, Welch; Ralph E. Sipple, Shoreview; Robert E. Swenson, Mendota Heights; James F. Torgerson, Anoka; Anthony P. vonArx, New Brighton, all of Minn.

[73] Assignee: Unisys Corporation, Blue Bell, Pa.

[21] Appl. No.: 432,421

[22] Filed: Nov. 6, 1989

[51] Int. Cl.$^5$ .............................................. G06F 13/00
[52] U.S. Cl. ...................................... 395/425; 395/575; 395/600; 364/DIG. 1
[58] Field of Search ... 364/200 MS File, 900 MS File; 395/425, 600, 113, 114, 115; 365/229; 371/21.2, 21.5, 21.6, 24, 25.1

[56] References Cited

U.S. PATENT DOCUMENTS

| | | | |
|---|---|---|---|
| 4,020,466 | 4/1977 | Cordi et al. | 340/172.5 |
| 4,077,059 | 2/1978 | Cordi et al. | 364/200 |
| 4,084,231 | 4/1978 | Capozzi et al. | 364/200 |
| 4,327,410 | 4/1982 | Patel et al. | 364/200 |
| 4,394,732 | 7/1983 | Swenson | 364/200 |
| 4,521,847 | 6/1985 | Ziehm et al. | 364/184 |
| 4,654,819 | 3/1987 | Stiffler et al. | 364/900 |
| 4,750,137 | 6/1988 | Harper et al. | 364/514 |
| 4,751,639 | 6/1988 | Corcoran et al. | 364/200 |
| 4,751,670 | 6/1988 | Hess | 364/900 |
| 4,751,702 | 6/1988 | Beier et al. | 371/9 |
| 4,752,910 | 6/1988 | Yen et al. | 364/900 |
| 4,755,928 | 7/1988 | Johnson et al. | 364/200 |
| 4,755,930 | 7/1988 | Wilson, Jr. et al. | 395/425 |
| 4,819,154 | 4/1989 | Stiffler et al. | 364/200 |

(List continued on next page.)

OTHER PUBLICATIONS

Smith, Alan Jay, "Cache Memories", *Computing Surveys*, vol. 14, No. 3, Sep. 1982, pp. 473-530.
Bernstein, Philip A. and Goodman, Nathan, "Concurrency Control in Distributed Database Systems," *Computing Surveys*, vol. 13, No. 2, Jun. 1981, pp. 186-221.
Gray, J.; McJones, P.; Blasgen, M.; Lindsay, B.; Lorie, (List continued on next page.)

*Primary Examiner*—Joseph L. Dixon
*Assistant Examiner*—Frank J. Asta
*Attorney, Agent, or Firm*—Glenn W. Bowen; Mark T. Starr

[57] ABSTRACT

A multiprocessor data processing system is implemented with processors, each of which may request for a temporary time the exclusive lock on an object which is stored on a data base. To achieve this a lock processor synchronizes the locking and unlocking of the objects. The requesting processor directs the storage of the object from the data base into a selected high performance storage unit, where it has exclusive rights to modify or write into the object until the object is unlocked by the processor. An audit tape or disk records all modifications made to any object during a transaction. A non-volatile cache memory is inserted in the audit trail to store a before-look image of the object that resides in the high performance storage unit. Data compaction occurs by comparison of the before-look image with an after-look image to provide a difference image, which is supplied to an audit buffer that is coupled to the audit tape. The locking processor may unlock the secured object once the after-look image has been committed from either a stored version in the non-volatile cache or from a high performance main memory unit to the data base disk. The difference image and the after-look image associated with the difference image may then be stored in the non-volatile cache, and provided to the audit tape or disk and the data base disk in a sequence which is independent of the operating sequence of the requesting processor.

1 Claim, 2 Drawing Sheets

U.S. PATENT DOCUMENTS

| | | | |
|---|---|---|---|
| 4,819,156 | 4/1989 | DeLorme et al. | 364/200 |
| 4,819,159 | 4/1989 | Shipley et al. | 364/200 |
| 4,823,261 | 4/1989 | Bank et al. | 364/200 |
| 4,827,399 | 5/1989 | Shibayama | 364/200 |
| 4,847,804 | 7/1989 | Shaffer et al. | 395/425 |
| 4,948,138 | 8/1990 | Pease et al. | 365/229 |
| 5,007,027 | 4/1991 | Shimoi | 365/229 |

OTHER PUBLICATIONS

R.; Price, T.; Putzolu, F.; Traiger, I.; "The Recovery Manager of the System R. Database Manager," *Computing Surveys*, vol. 13, No. 2, Jun. 1981, pp. 223–242.

Kohler, W. H., "A Survey of Techniques for Synchronization and Recovery in Decentralized Computer Systems," *Computing Surveys*, vol. 13, No. 2, Jun. 1981, pp. 149–183.

Haerder, Theo and Reuter, Andreas, "Principles of Transaction–Oriented Database Recovery," *Computing Surveys*, vol. 15, No. 4, Dec. 1983, pp. 287–317.

Verhofstad, Joost S. M., "Recovery Techniques for Database Systems," *Computing Surveys*, vol. 10, No. 2, Jun. 1978, pp. 167–195.

Kaunitz, John and Van Ekert, Louis, "Audit Trail Compaction for Database Recovery," Communications of the ACM, vol. 27, No. 7, Jul. 1984, pp. 678–683.

CACHE MEMORY WITH DATA COMPACTION FOR USE IN THE AUDIT TRAIL OF A DATA PROCESSING SYSTEM HAVING RECORD LOCKING CAPABILITIES

BACKGROUND OF THE INVENTION

1. Field of the Invention

The present invention is related to data processing systems having the ability to recover data from audit trail tapes when failures occur in the system.

2. Description of Background Technology

In certain applications for data processing systems, it is crucial to insure that data is not lost or corrupted. Banking, stock market, and airline reservations, for example, are businesses in which it is essential to insure the system is not down and the data is not unavailable for even short periods of time, and that the correct state of the data base is maintained. Since computer systems are subject to malfunctions and human error, data can be corrupted, made inaccessible or lost altogether. Numerous recovery techniques have been devised to minimize the distortion, and in critical applications to even reconstruct a data base after failure of the system.

A comprehensive review of the recovery techniques that were available for data base systems as of 1978 is described in the article entitled "Recovery Techniques for Database Systems" by Joost S. M. Verhofstad, which appeared in the ACM publication *Computing Surveys*, Vol. 10, No. 2, Jun. 1978, pp 167-195. As described in the Verhofstad article, there are various levels of the different kinds of recovery that are available from recovery to correct state of the data base to mere crash resistance, which merely maintains the correct state as much as possible by the manner in which data are manipulated and maintained during normal processing. In data base applications in the above-mentioned industries and others where the maintenance of the correct state of a data base is critical, recovery must be made to a correct state. As the Verhofstad article notes, the audit trail technique is the only one of the seven different types of recovery techniques that are described which have the capability of maintaining the data base in the correct state. Audit trails are used to record each change of a data base record as it occurs so that when the systems fails, the files may be restored to the states they were in prior to the failure. Or alternately the records may be backed-out through a particular process.

Audit trail records for large data base systems, particularly those designed for high transaction environments, can become quite voluminous since they contain information about the changes made to data base records and the times and dates when the changes occurred, along with codes to identify the user. In the high transaction environment, there must be a coordinated usage of a shared data base among a number of data processors. Record locking may also be incorporated into such a system to allow a current user to obtain access to a record and to modify it to the exclusion of other users, who may subsequently also obtain and modify the record when the first user is done with the record.

The file, for example, may be the number of seats that are available on a commercial airline where it is apparent that once a reservations agent has obtained the record and assigned a certain seat, and thereby modified the record, that subsequent users of the record must be locked out during the time the first user is modifying the record. In the event a system failure should occur immediately subsequent to the modification of the record by the first user, the audit trail would then come into effect to reconstruct the data base record to the correct state which would show that the seat that was allocated by the last user before the crash of the system and was no longer available for such a reservation.

Data base recovery transaction techniques are discussed in the article entitled "Principles of Transaction-Oriented Database Recovery" by Theo Haerder and Andreas Reuter in the ACM publication Computing Surveys, Vol. 15, No. 4, Dec. 1983, pp 287-317. FIG. 4 of this article on page 294 shows a typical data base management system, which has a volatile data base buffer and output buffers to the log files, which are also volatile, so that information in these are lost whenever the data base management system experiences abnormal failure. An on-line version of the data base is maintained in a direct access disk, while an older achieved copy of the data base is maintained in a tape file. A disk temporary log is used to collect information needed to reconstruct the most recent data base, and a separate archive log is maintained on the tape which contains all of the changes that have been committed to the data base following the storage of the archive copy of the data base.

The Haerder and Reuter article on page 300 defines physical logging of log data to be whenever some part of the physical representation of the data is written to the log. The article goes on to state that the early applications of physical state logging on page level required that a whole page that was modified had to be rewritten to the log. The article further noted that physical transition logging on the page level was known wherein the old, or "before-look" image, and the new, or "after-look" image, states of a page did not have to be written to log as long as the difference between the log are recorded. This difference may be obtained by using exclusive OR circuits (XOR's) to compare the before-look and after-look images of the page. When these differences are obtained and applied to the before-look image of the page, the new or after-look image results. Similarly, if the difference image is applied to the after-look image of the page, it may be used to provide the before-look image.

An article entitled "A Survey of Techniques for Synchronization and Recovery in Decentralized Computer Systems" by Walter H. Kohler was published by the ACM publication *Computing Surveys*, Vol. 13, No. 2, Jun. 1981, pp 149-183. The article describes the synchronization of access to shared objects and the recovery of objects in spite of system failures or user errors. Starting on page 155, section 2.1 of this article describes the use of locking schemes to insure the inaccessibility of a locked object, such as a record, while it is under the control of one user in a multi-user system, and, therefore, may be in a temporarily inconsistent state with the maintained record on the data base disk. When a second user or transaction attempts to lock an object that is already locked in an application, such as an airline reservation, or banking or stock exchange sale transaction, the second transaction will wait until the original user unlocks the object.

The Kohler article goes on to state that transactions must be "well formed" and two-phase in order to guarantee data base consistency. A transaction is well-formed when it obtains a lock on the object before it is accessed, does not lock an object which is already locked, and before it completes, unlocks each object it locked.

A two-phase locking scheme occurs if no object is unlocked before all objects are locked. In order to accommodate this desired synchronization, requested locks on the same object may be processed in a queue list memory. The use of a queue list memory for a record lock processor is described in co-pending application entitled "Record Lock Processor for Multiprocessing Data System," Ser. No. 07/759,805, filed Sep. 16, 1991, which is a continuation of Ser. No. 07/669,788, filed Mar. 15, 1991, now abandoned, which is a continuation of Ser. No. 07/167,748, filed Mar. 14, 1988, now abandoned. The Kohler article on page 167 notes that the reconstruction of the initial states of all objects usually involves the maintenance of an incremental log of all the changes that were made to objects on nonvolatile storage.

A further description of related recovery and locking techniques are described in the articles entitled "The Recovery Manager of the System R Database Manager" by Jim Gray, Paul McJones, Mike Blasgen, Bruce Lindsay, Raymond Lorie, Tom Price, Franc Oputzolu and Irving Traiger, published in the ACM publication *Computing Surveys*, Vol. 13, No. 2, Jun. 1981, pp 223-242, and "Concurrency Control in Distributed Database Systems" by Philip A. Bernstein and Nathan Goodman, which appeared in the ACM publication *Computing Surveys*, Vol. 13, No. 2, Jun. 1981, pp 185-221.

During the passing of data in multi user, high-speed, high-transaction systems, cache memories associated with each of the multi processing units are required to achieve adequate execution speeds. Typical large scale main mass memories have typical access times of 300 to 600 nanoseconds, while information can be obtained from the cache memory on the order of 50 nanoseconds or less. For this reason virtually all modern large scale computing systems have cache memories. Cache memories are now being extensively used in minicomputers, and are also appearing even in microcomputers. The principle of the cache memory when used to provide records from a data base for data processing is that for short periods of time a program generally will distribute its memory references nonuniformly over its address space.

For example, in an airline reservation system there are certain times before a flight is to take place in which there generally are a substantially larger number of accesses to the record than there are at other times. The cache memory holds the records that are being used most over a period of time so that information located in the cache memory may be accessed in a much shorter time than that located on the main data base disk. A typical cache memory is, therefore, relatively small, fast and volatile. A comprehensive discussion of cache memories is found in the article entitled "Cache Memories" by Alan Jay Smith published in the ACM publication *Computing Surveys*, Vol. 14, No. 3, Sep. 1983, pp 473-530.

U.S. Pat. No. 4,654,819 entitled "Memory Back-Up System", issued Mar. 31, 1987 in the names of Jack J. Stiffler, et al. discloses the use of two physically separate memory areas of the main memory. A status block in the main memory is also used to keep track of the updating of the two memory areas. At the end of the storage operation, the first memory area is initially updated and the status block records this updating. Subsequently, the updating is written to the second area. The status block will then record the completion of data entry into the second memory area. Thus if a fault occurs before the first memory element has been modified, the data and starting addresses in the first memory area are what they were before the processing began, and the program can be restarted at this point.

Alternately, if the processing element fails after the writing began in the first area, but before it was completed, the status block in the main memory would indicate the writing operation was not completed and the fault recovery routine would need only to write the contents of the program from the second area into the first. In a like manner, the computer system can recover from a fault which occurs during modification of the program's second area by assigning a new second area to the program and re-copying the contents of the first area into the second area. U.S. Pat. No. 4,819,154 entitled "Memory Back Up System with One Cache Memory and Two Physically Separated Main Memories" issued Apr. 4, 1989, is a continuation of a Stiffler, et. al. U.S. Pat. No. 4,654,819.

U.S. Pat. No. 4,819,159 entitled "Distributed Multiprocess Transaction Processing System and Method" by Dale L. Shipley, et al., issued Apr. 4, 1989, is directed to a communications environment of a fault tolerant processing system having a plurality of processing units. Each of the processing units requires a real time processor and a specialized processor in a local nonvolatile memory. Transaction based processing is undertaken which requires locking provisions. The nonvolatile memory stores the log for the associated processor. When a processing unit fails, a transaction coordinator in the processor enables another of the plurality of processing units to establish communication with its non-volatile memory means.

The log associated with the processing unit is then scanned to determine entries of information that are inconsistent with information that is stored in the file system. Other processing units are then interrogated to identify inconsistencies between the logs that they have and the log of the failed unit in order to allow the processing unit that failed to commit or abort the transactions it has been assigned. This insures that processing by the failed unit will be consistent with information stored in the file system, so that a second processing unit is thereby enabled to coordinate the transactions that were formerly coordinated with the failed processing unit.

Unisys Corporation has previously developed a data base recovery system for the Universal Data System (UDS). This system was developed for multi processing operation to allow the implementation of both a first recovery scheme called "Quick Look Recovery" and a second recovery scheme termed "Deferred Update Recovery." In Quick Look Recovery, the data base record was stored in the processing cache of the processor which had obtained a lock upon it. In the case of a write lock, before the alteration actually occurred, the before-look image look of the record was written into a storage retention file. The after-look image of the record was then formed in the processing cache until it was needed by a transaction.

Once the transaction was completed the updated record was processed to the audit trail, and then the data base was updated in a two-phase commit process.

Completion of the transaction was also noted on the audit trail tape. Thus at the end of the transaction commit, the after-look image would be written on the data base, the before-look image would be present in the retention file, and the updated after-look image information would be present in the audit trail. When recovery was necessary following an error, roll-back was undertaken by reading before-look images from a retention file and writing them back to the data base. This form of recovery is efficient for programs which do a large number of updates before committing.

The other method of operation of the UDS data base recovery system was termed Deferred Update Recovery. The same elements involving the data base, the processing cache, the processor requesting the lock, the audit trail tape and the retention file are employed in this version. With this technique, the data base record is retained in the cache until it has been modified but no before-look image is generated. The fact that the transaction is recoverable and active is recorded by the audit trail. When the transaction commit is requested following a number of updates in the cache, they are first staged to the audit trail, and then they are written to the retention file.

If a system failure occurs before the copies of the updates are written to the retention file and the audit trail, the recovery action is to roll the transaction back. This is acceptable because the data base has not been updated and the requesting transaction has not been notified of completion. The fact that a copy of the update has made it to the audit trail and the retention file is recorded on the audit trail as "commit in progress." If a failure happens after "commit in progress" but before a commit is complete, the recovery action is to roll the transaction forward by copying the updates from the retention file to the data base.

In the normal case of a successful completion, the updates are written to the data base after they are successfully written on the audit trail and the retention file, both of which use non-volatile media.

SUMMARY OF THE INVENTION

The present invention is directed toward use in a multiprocessing data processing system in which a defined object, such as a record or page or file, may be locked by a requesting processor. The object will then be obtained from the data base disk or from a local store memory. The unmodified before-look image of the locked object is transferred into a non-volatile cache memory. The object in the local memory of the processor is then modified to form an after-look image which is also transferred to the non-volatile cache memory. The before-look and after-look images of the object in the non-volatile cache memory are then compared, and a compacted difference image representative of only the differences between the two images is transmitted to an audit buffer in the non-volatile memory.

From the audit buffer the difference image is sent to an audit storage device under the independent software control. Once before-look and after-look images have been stored in the non-volatile cache memory, or have been used to form the difference image, the requesting processor may proceed with the transaction which it desires to perform without awaiting transfer of the difference image to the audit storage device. In addition, the after image update of the object may be retained in the non-volatile cache memory, and also may be used to update the data base under the control of the cache control in a manner independent of the processing of the transactions by the requesting processor.

A non-volatile cache memory may be formed of inherently non-volatile memories, however, functional non-volatile cache memories maybe provided for larger systems in which the specified size and cost of the memory cannot be feasibly implemented with currently available inherently non-volatile memory components. This is accomplished by duplicating volatile cache memory units and providing a common output data path with separate power supplies for each of the memories. Thus, if either of the power supplies fail, the other parallel, duplicate cache memory unit will continue to supply the required data paths. In addition, a battery-backup device may be coupled to the two memories to provide further security against failure if both of the power supplies should fail. If desired, this battery-backup may even be split into two separate backup systems, either of which can support both memories.

BRIEF DESCRIPTION OF THE DRAWINGS

The present invention is described by reference to the drawings in which.

DETAILED DESCRIPTION OF THE INVENTION

Figure 1:
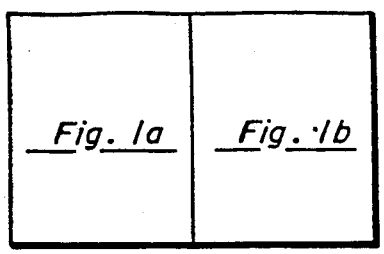
FIGS. 1, 1a and 1b are block diagrams showing the audit trail cache memory of the present invention and a data processing system in which it may be used.
Figure 1A:
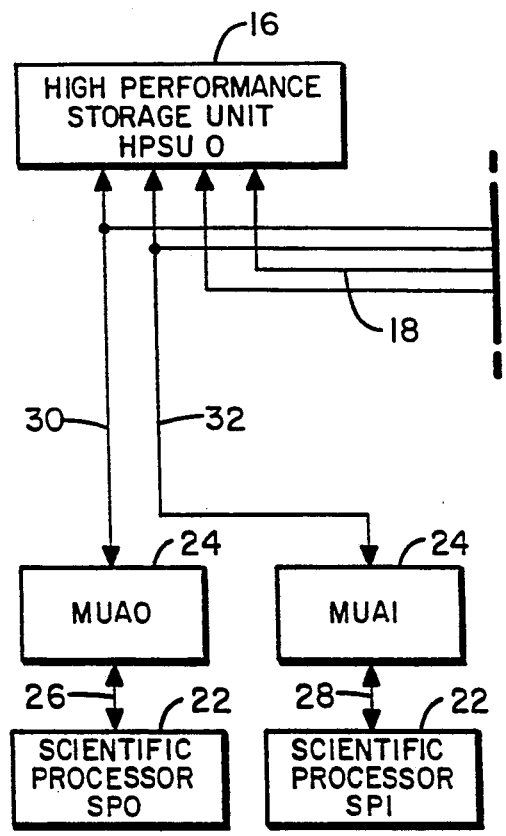

Digital Data Processing System in which the Present Invention may be Utilized The data processing system of FIG. 1 is modular architecture and may be used for parallel processing. A suitable general architectural system in which the present invention may be utilized is shown and described in U.S. Pat. No. 4,649,475 issued Mar. 10, 1987 in the name of James H. Scheuneman, which is owned by the assignee of the present invention, U.S. Pat. No. 4,649,475 is hereby incorporated by reference herein.

For the configuration illustrated, from one to four Instruction Processors IP0 through IP3, each labelled 10, which provide basic mode and extended mode instruction execution, virtual machine capability, and contains two buffer memories (not shown), one an operand buffer, and the other an instruction buffer. Each IP is functionally able to call instructions from memory, to execute the instructions, and to perform general data manipulation. The IP also executes instructions to set up input and output data buffers and channel access control.

In conjunction with the IP's, from one to four Input-/Output Processors IOP0 through IOP3, labelled 12, can be utilized. The interconnections between the IP's and IOP's collectively labelled 14, are, in fact, direct connections between each unit, and the interconnection is not bused in the described embodiment, but this limitation is not critical to the present invention. The IOP's handle all communications between the IP's, the memory systems and the peripheral subsystems (not shown). In this type of configuration, the IP's function as the central system processing units, and the IOP's act as CPU's to handle all of the communications.

From one to four High Performance Storage Units, HPSU0 through HPSU3, each labelled 16, can be utilized in the system. Each HPSU is a free-standing unit with multiple memory banks. Each HPSU provides four Instruction Processor (IP0 ports for providing communication paths to the IP's, both for reading and writing, shown collectively as interconnection paths 18. Again, it should be understood that interconnection between each HPSU and each IP is directly cabled, and is not bused in the described embodiment.

Each HPSU also includes four Input/Output Processor (IOP) ports for interconnection with the IOP's. These interconnections are shown collectively as interconnections 20 and are direct cables between each HPSU and each IOP. The IP and the IOP ports are each two-word read and write interfaces, where each word contains 36 data bits and four parity bits can be utilized.

Each HPSU further may include at least one scientific Processor (SP) port, and the embodiment shown has two such SP ports. Error Correction Code (ECC) may be used for each HPSU to provide single-bit error correction and double-bit error detection. The HPSU used may include the novel memory system that is described in the above-identified incorporated-by-reference U.S. Pat. No. 4,649,475.

In the embodiment illustrated one or two Scientific Processors SP0 and SP1, labelled 22, can be utilized. If a single SP is used with a single HPSU, it may be coupled directly to the SP port of such HPSU. When two or more HPSU's are used with an SP, it is necessary to provide a Multiple Unit Adapter (MUA) for each SP. In this configuration MUA0 and MUA1, each labelled 24, are coupled to SP0 and SP1, respectively, across interface lines 26 and 28. MUA0 is coupled to each HPSU through interconnection paths 30, and MUA1 is coupled to each HPSU through interconnection path 32.

Each SP functions under direction of one or more of the IP's to perform scientific type calculations in a support mode. In this regard, the IP's can be considered to be host processors and the SP's can be considered to be support processors, all operating through common storage.

The overall system maintenance and supervision is accomplished through one or two System Support Processors SSP0 and SSP1, each labelled 34, which are connected to all units of the system. Each SSP performs the function of a hardware maintenance panel for the system. The display and setting of information, the activation of most maintenance facilities, selecting modes of operation and the like is done at the control section of the SSP.

A clock system 36 is utilized to maintain synchronous operation of the entire system. Clock and synchronizing signals are sent to each IP as well as each HPSU, each IOP, and each SP. The clock interface includes signals and commands from the IP for controlling clock rates, clock mode, cycle count, and other capabilities of the clock.

A Record Lock Processor (RLP) 17 is coupled to the IP's by the lines 19, 21, 23 and 25. The RLP is described in greater detail in U.S. Pat. Application Ser. No. 07/759,805, filed Sep. 16, 1991, which is a continuation of Ser. No. 07/669,788, field Mar. 15, 1991, now abandoned, which is a continuation of Ser. No. 07/167,748, field Mar. 14, 1988, now abandoned, and is assigned to the assignee of the present invention. This application is also incorporated by reference herein.

The present invention, however, is implementable by those skilled in the art in other data processing systems and using different components than those described herein and while using different locking mechanisms than that of the above-noted application. Moreover, the lock may be made on any data base object besides records, such as pages, files, etc. The Record Lock Processor functions as an on-line peripheral device that manages record, block and file locks for all shared mass storage that are attached to a multi-host loosely coupled system data processing system.

The RLP performs Write, Read and Sense commands to accept control packets and messages from the connected hosts and to send data packets, messages and status to the connected hosts. It also performs locking sub commands like Lock, Unlock, Forward Message, etc., to manage locks and messages and to perform other desirable functions for an RLP. The RLP is controlled by packets containing process, record, block, file parameters such as subcollection number, process number, and object name to identify the controlling entity and the target object. Control packets and messages can be sent individually or in streams.

Audit Trail Cache Memory

Advantages of the Present Invention over Past Practices. In a transaction processing system there is a need to be able to recover the data base in the event of any failure in the computer system. One of more common approaches used to guarantee the correctness of a data base update is the two-phase commit technique.

In the two-phase commit process, first an update record is written to a temporary media or to an audit media, (or both), and when that write is completed successfully, the update to the real data base can take place. In case of a failure during the update of the data base, the audit copy can be used to update the data base. This recovery action is called a Roll-Forward of the transaction. If there is a failure during the write to the audit media, the data base is unaltered and there the old, before-look image is still good. In this case, the transaction is called a Rolled-Back word recovery, and the update must be retried.

With the audit trail cache memory of the subject invention writing to a temporary media is not required before a transaction can complete. Instead the write is made to the non-volatile memory. It is then possible to roll a transaction forward or roll a transaction backward during recovery, as appropriate, because there are two copies in the non-volatile memory, the initial, or before-look, copy, and the updated (after-look) copy. If there is a failure during the process, recovery can be made because we still have the initial copy. This capability to have multiple images of a given object present in the high speed non-volatile memory is the key to eliminating extra input/output (I/O) write operations in case there is a failure and recovery is required.

A write to the non-volatile memory takes place at speeds comparable with instruction processor memory speeds as opposed to speeds available on a device on an I/O channel. The fast release will lower the existence time of the I/O operation (i.e., the time needed for the entire operation) by factors on the order of 5 to 50 depending on the basis of comparison. Lowering the existence time of an I/O lowers the existence time of a transaction since most of the non-overlapped time in transaction is I/O time.

The Record Lock Processor is in the same cabinet as the non-volatile memory so the host can achieve a lock and read on one I/O to the non-volatile memory. This means the efficiency of the closely coupled multi processor is increased.

Reducing the existence time of a transaction may:

1) provide a better response time for the transaction; or 2) allow more transactions to be processed (This is especially true on systems which are I/O bound. For systems which are processor bound already, e.g., greater than 95% busy, no appreciable gain in throughput is expected); or 3) reduce the number of logical conflicts in the data base. (If the objects are locked by a transaction for less time, the same objects can be used sooner by other transactions needing that resource. Increasing the number of transactions per unit time increases the throughput of the overall system.)

A transaction typically will store its state multiple times while the transaction is running. The storage of the state information must go to a media which will survive a failure. Today that media is typically magnetic storage, i.e., tape or disk. With this invention, the state of the transaction can be stored in an assigned area in the non-volatile memory. Storing the transaction state information in the non-volatile memory is done at main memory speeds instead of speeds associated with a device on an I/O channel. Reducing the time to store the transaction state information significantly reduces the existence time of the transaction because the transaction must wait for successful completion of at least one version of the state storage operation before the system guarantees recoverability. Multiple I/O cycle wait times are avoided per transaction by writing the transaction state to the non-volatile memory.

The non-volatile memory is used to accumulate audit messages before sending the messages to the audit device (tape or disk, for example). By writing the messages into the non-volatile memory, the system does not have to wait for the write to the audit media to be completed because the message is recoverable from the non-volatile memory. The fast release provided by the non-volatile memory increases the throughput because a recoverable transaction must be secure on a non-volatile media before the transaction can proceed. The non-volatile media in this invention is the non-volatile memory instead of typically magnetic tape or magnetic disk. The non-volatile memory recovery scheme used involves "quick look," that is, all updates are made to the non-volatile cache memory copy immediately, and a before-look is formed in case there is a failure. (After-look are also formed.) The host still then run on deferred update strategy and only output to the non-volatile memory at commit time. The non-volatile memory gets all the updates at once when the host signals commit.

The instruction path length (i.e., the number of required instructions) needed by a transaction generally will also be reduced because of the extra I/O steps needed to access the retention files. Temporary storage steps used in the two-phase commit processes are eliminated. There is also a reduction due to an improved path length afforded by a software disk cache over standard I/O path lengths. Reduced processor instruction path length further yields higher throughput since effectively there is less work to do per transaction, and therefore more transactions can be processed per unit time.

This invention provides for reduced recovery time because the objects of interest are resident in the high speed non-volatile memory instead of on a device on an I/O channel, such as a disk. In the audit trail cache memory of this invention before-look and after-look images are available to provide the two inputs to a compactor. The compactor stores just the changed portion of the objects instead of the whole object. The change form of the object requires significantly less volume to audit media, e.g., audit tapes or disk.

Since the invention provides for reduced audit media, this has the effect of requiring less time to search through the audit media when it is required to rebuild an entity, e.g., a file. The reduced time is due to the fact that a significant portion of the recovery time is spent doing I/O to find the objects of interest and to update the current copy. The cache memory will reduce the number of I/O requests to the I/O channels and the mass storage units if most of the records being requested are found in the cache due to caching of the updates applied from the audit trail. Consequently, the existence time of a transaction will be reduced and the number of channels and mass storage units required will be reduced. Reducing the number of I/O channels and mass storage units will reduce the system's cost. The update of the current copy is done faster also because of the quick release provided by the non-volatile cache.

In summary, the following advantages are among those available with the present invention over past practices:

1) reduced existence time for a transaction;
2) increased throughput for most systems;
3) reduced processor instruction path length;
4) reduced time to recover a data base in the event of any failure; and
5) reduced audit media volume and cost.

A Preferred Embodiment of the Audit Trail Cache Memory. The described data processing system of FIG. 1 is shown as operating in conjunction with a large mass storage data base disk 40 and an audit storage device, such as a type or disc, 42 which is used in the recovery of the data base only if the system malfunctions, operator error or other crash condition occurs. The present invention is realized by the incorporation of the non-volatile cache memory 44 into the audit trail. This is accomplished by coupling the cache memory means to the non-volatile audit storage device 42 via the lines 46, and to the instruction processors 10 via the lines 48, 50 and 52. The audit storage device 42 and the data base disk 40 are coupled to each other via the lines 54, and to the high performance storage units (HPSU) 16 via the lines 56.

The non-volatile cache memory 44 is implemented with high speed memory elements the reading and writing of which is under control of the cache control 58, which may be constructed in accordance with known cache control techniques. In the described embodiment the non-volatile cache is a unit which is common to all of the instruction processors 10. It is also possible to implement the present invention by utilizing inherently non-volatile cache memory units, which may be either separate or integrated into existing cache memory units in the IP 10, or which may also be implemented as a section of a high performance storage unit 16 along with the required cache memory which is presently provided for such distributed multiprocessing cache systems.

When an IP 10 has obtained a lock on an object in the data base 40 (which in the described embodiment is a record, although it may be any other reasonable data object such as a page or a file), it provides a copy of this image to a before-look memory area 60 where an image of the object is recorded in the cache memory 44. It is assumed in the illustrated embodiment that the before-look image came from a high performance storage unit 16 that is locked by the requesting IP 10 after the HPSU received the object from the data base disk 40. The IP during a transaction which requires the modification of the before-look image of the object of the selected HPSU 16 will modify the object to create an after-look image.

In the illustrated embodiment, the after-look image is transmitted on the line 52 and may be stored in another memory area 62 of me cache memory 44. There are several alternative ways within the scope of the present invention that the after-look image may be provided. For example, the after-look image may be stored in a buffer rather than a cache memory section. Alternately, it can be stored in the HPSU and could be transmitted to the cache memory 44. Regardless of the implementation, the before-look image is provided on the lines 64 while the after-look image is provided on the lines 66 to a data compactor 68.

The concurrent application of the before-look and after-look images to the data compactor 68, which may be an XOR network of gates, provides a representation on the lines 70 of the difference between the before-look image and the after-look image. A list of words that have been changed in an object is formed and is stored in the non-volatile memory. The difference image is sent on the lines 70 is sent to the audit buffer 72. The cache control is connected by the lines 74, 76, 78 and 80 to the before-look memory area 60, the compactor 68 and the after-look memory area 62, respectively, and via the lines 82 to the audit buffer 72. The after-look memory 62 is coupled to the data base disk 40 over the lines 83. The cache control 58 provides the previously mentioned advantages of fast release on input/output operations, fast release of transaction control and the fast release on audit. This allows for known post-store processes to provide the information to the data base when it is convenient for the system thereby increasing the efficiency of the system.

Once the difference image is formed from the before-look image and the after-look image, the before-look image is updated to become the after-look image. At this point the transaction is committed and the requests can be acknowledged.

At a later time the after-look image will be written to disk as a function of use and the caching algorithm. The difference image is written to an audit media when convenient, but in any event only after the transaction is complete. The before-look images are discarded since there is no need to roll back a transaction after the transaction is committed.

Figure 2:
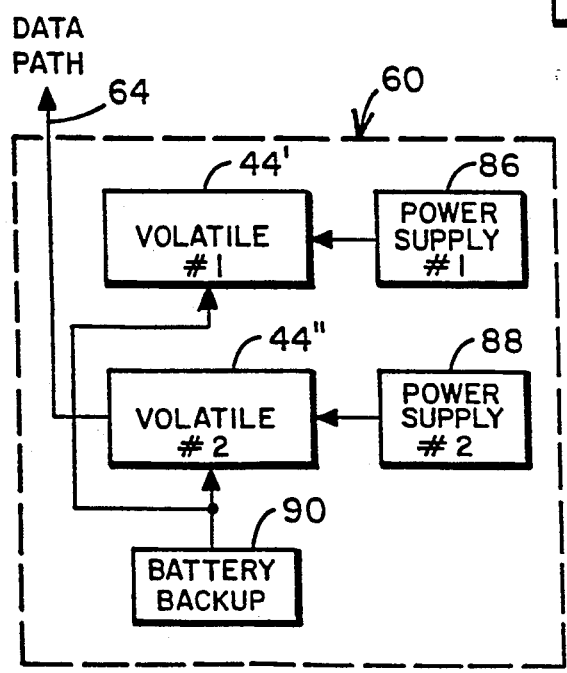
FIG. 2 is a block diagram that shows a technique for achieving functional non-volatility for the audit trail cache memory even when memory chips that are inherently volatile are utilized.
Figure 1B:
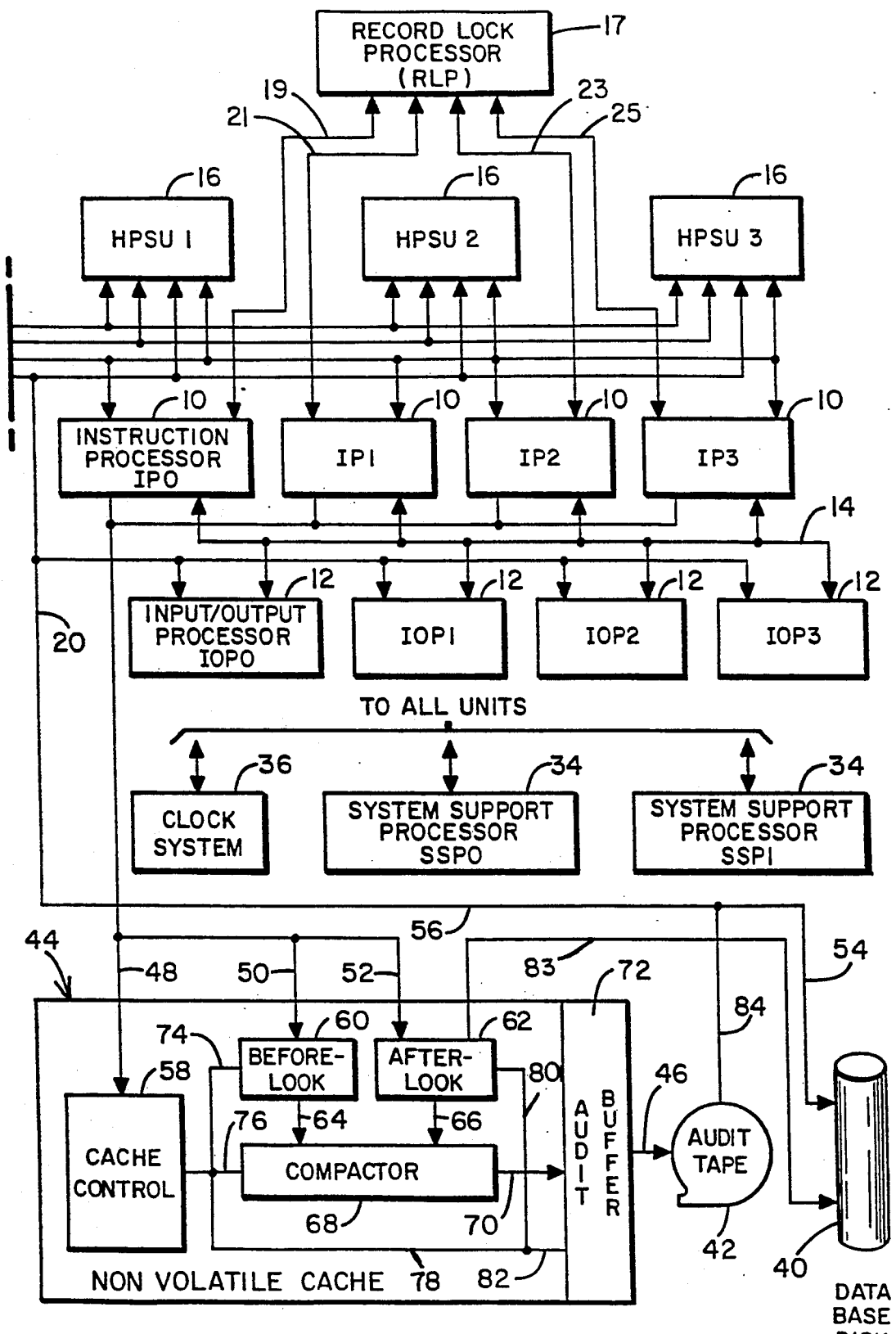

It would be preferable if the elements in the non-volatile cache 44 were inherently non-volatile. However, at the present time acceptable inherently non-volatile cache memory devices that are useful for high transaction multiprocessing systems are not available. Functional non-volatility, however, can be provided by duplicating the non-volatile cache memory elements, as shown in FIG. 2. The before-look memory area 60, or chip, may be implemented as a number 1 volatile cache memory 44' and as a number 2 duplicate volatile cache memory 44". These memories would have, a common data path 64, however, and each of the memories 44" and 44" would be supplied by its own power supply, such as the number 1 power supply 86 for the cache memory 44' and the number 2 power supply 88 for the cache memory 44". Thus, if either of the power supplies 86 or 88 fail, the other redundant memory of the pair of memories 44' and 44' provides the required image. The non-volatility of the memory results from the battery backup. The two copies, etc., provide resiliency to any single failure. such resiliency is what is required, in addition to non-volatility, in transaction environment.

In addition, a battery-backup may be coupled to both of the duplicate cache memories to provide power in the event that both of the power supplies 86 and 88 fail simultaneously. The element 44 indicated in FIG. 1 as a cache memory may, therefore, include all of the components of the alternate cache memory system shown in FIG. 2 where each of the memories 44' and 44" may contain the same internal elements shown for memory element 44 of FIG. 1. The manner in which the memories 44' and 44" are to be connected in parallel and controlled to substitute the duplicate cache memory 44 shown in FIG. 2 for the illustrated non-volatile cache memory 44 shown in FIG. 1 will be obvious to those skilled in the art.

In the embodiment where the after-look image is stored in the non-volatile cache memory 44 in the after-look memory area 62, the cache control 50 can control the time at which the after-look image is supplied to update the data base disk 40 by means of known caching techniques. If a write-through method is used, the after-look image is written into the data base disk 40 whenever it is written into the after-look memory area 62. If a post-store method is used, the after-look image is first written into the after-look memory area 62 and then subsequently at some later time is written into the data base disk 40. In both instances the instruction processor is able to begin processing the transaction as soon as the memory chip 62 contains the after-look image.

Another type of writing technique for writing from the after-look memory chip 62 into the data base which may be adapted to the present invention by those skilled in the art is shown in U.S. Pat. 4,394,732 entitled "Cache Disk Subsystem Trickle," issued Jul. 19, 1983 and assigned to the assignee of the present invention. The cache/disk of this invention has a storage control unit which controls the cache to transfer from the cache store to the disk subsystem. Segments of data are resident in the cache in a manner such that the segment does not have to be transferred to the disk at the time a new segment of data is written into the cache store, which in this case the new segment would be a new after-look image. The "trickling" of after-look images from the cache store to the disk drive data base are carried under the control of trickle commands which are formed by the cache control and are placed in command queues for execution.

What is claimed is:

1. In a data processing system comprising a plurality of processing means each of which comprises a processing storage means, and each of which may request an object be locked and thus become a requesting processing means, object locking and unlocking means coupled to said processing means for first locking and then unlocking selected ones of data base objects for processing purposes, as requested by said requesting processing means, data base storage means coupled to said object locking means and said processing means for storage of said data base objects which has a first access time, read means for supplying a before-look image of a locked object to the processing storage means of said requesting processing means, write means for supplying information regarding said before-look image of said locked object in said processing storage means to said processing means for creating an after-look image in the processing storage means of said requesting processing means, non-volatile audit trail storage means which has a second access time for storing audit information for recreating the locked object after a systems malfunctioned data base update means for updating said locked object prior to the unlocking of said locked object by said object locking and unlocking means, an improvement comprising non-volatile audit trail cache memory means coupled to said plurality of processing means, said non-volatile audit trail storage means and said data base storage means that has access times that are considerably less than said first and second access times wherein said non-volatile audit trail cache memory means functions as said data base update means and comprises before-look image storage means for receiving and storing a before-look image of a locked object of any said requesting processing means that has a lock on said locked object, after-look image receiving means for receiving and storing said after-look image of said locked object of said requesting processing means, data compaction means for comparing said before-look and said after-look images of said locked object of said requesting processing means and for providing a difference image of said locked object of said requesting processing means that is representative of the image difference between said before-look and said after-look images of said locked object of said requesting processing means, and coupling means for coupling said difference image of said locked object of said requesting processing means to said nonvolatile audit trail storage means.

* * * * *

UNITED STATES PATENT AND TRADEMARK OFFICE
CERTIFICATE OF CORRECTION

PATENT NO. : 5,193,162

DATED : March 9, 1993

INVENTOR(S) : Donald T. Bordsen, et al.

It is certified that error appears in the above-identified patent and that said Letters Patent is hereby corrected as shown below:

Column 13, lines 14 and 15, delete "malfunctioned" and substitute --malfunction and--.

Signed and Sealed this

Twenty-third Day of November, 1993

Attest:

BRUCE LEHMAN

Attesting Officer      Commissioner of Patents and Trademarks